Oct. 31, 1961  H. LANGMAN  3,006,581
VEHICLE AND STEERING APPARATUS THEREFOR
Filed Dec. 11, 1958  3 Sheets-Sheet 1
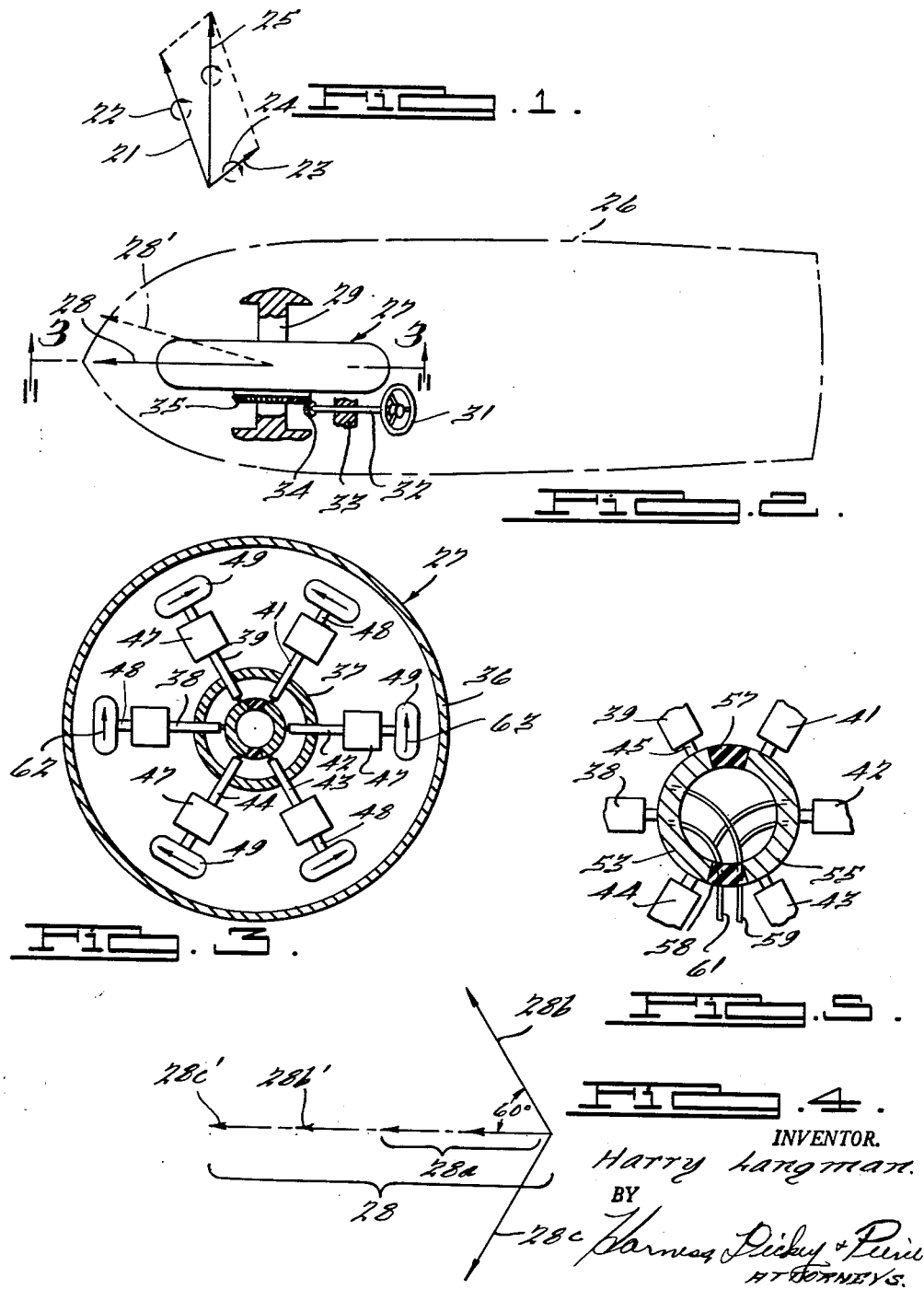
INVENTOR.
Harry Langman.
BY
Harness, Dickey & Pierce
ATTORNEYS.

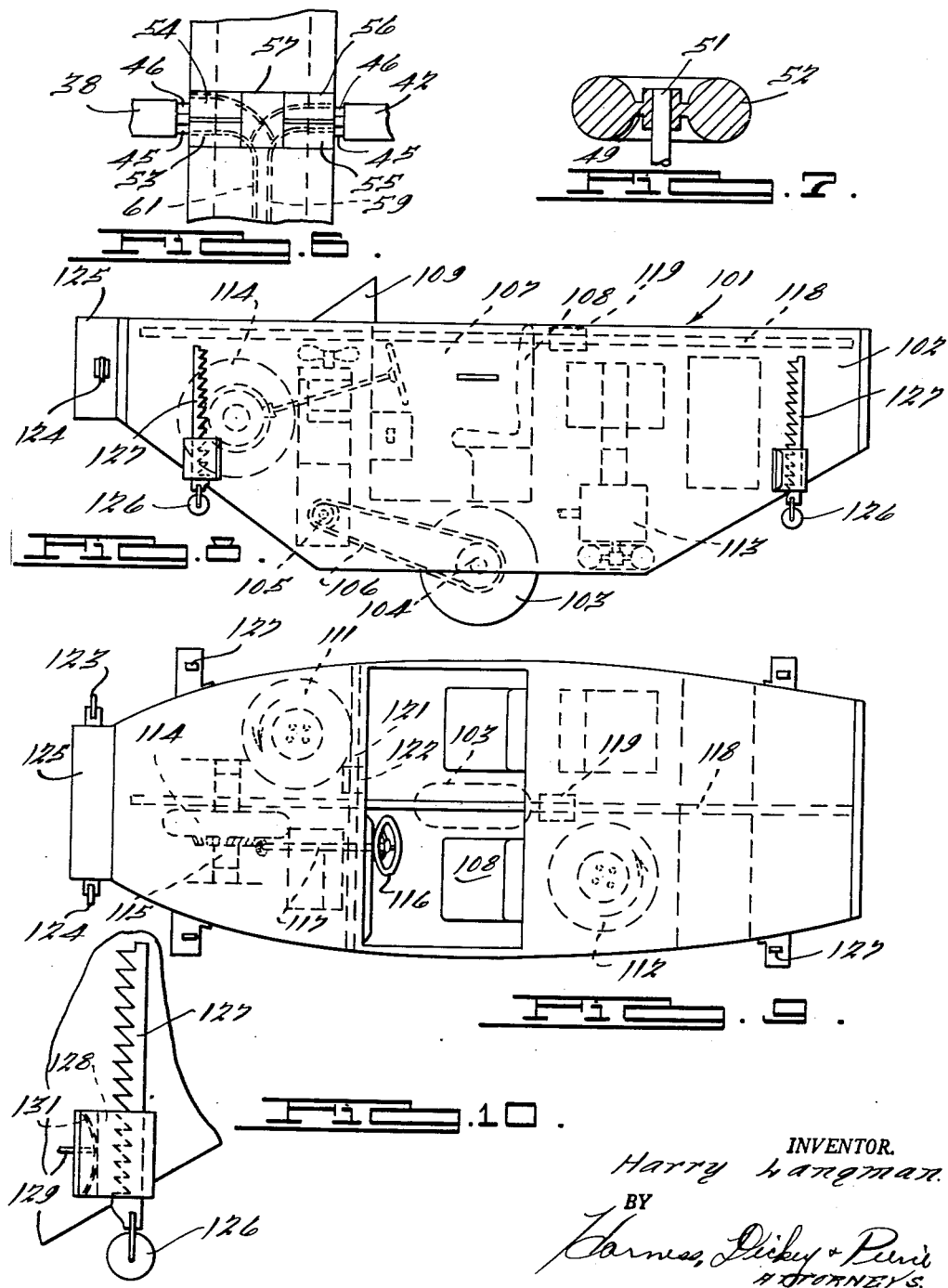

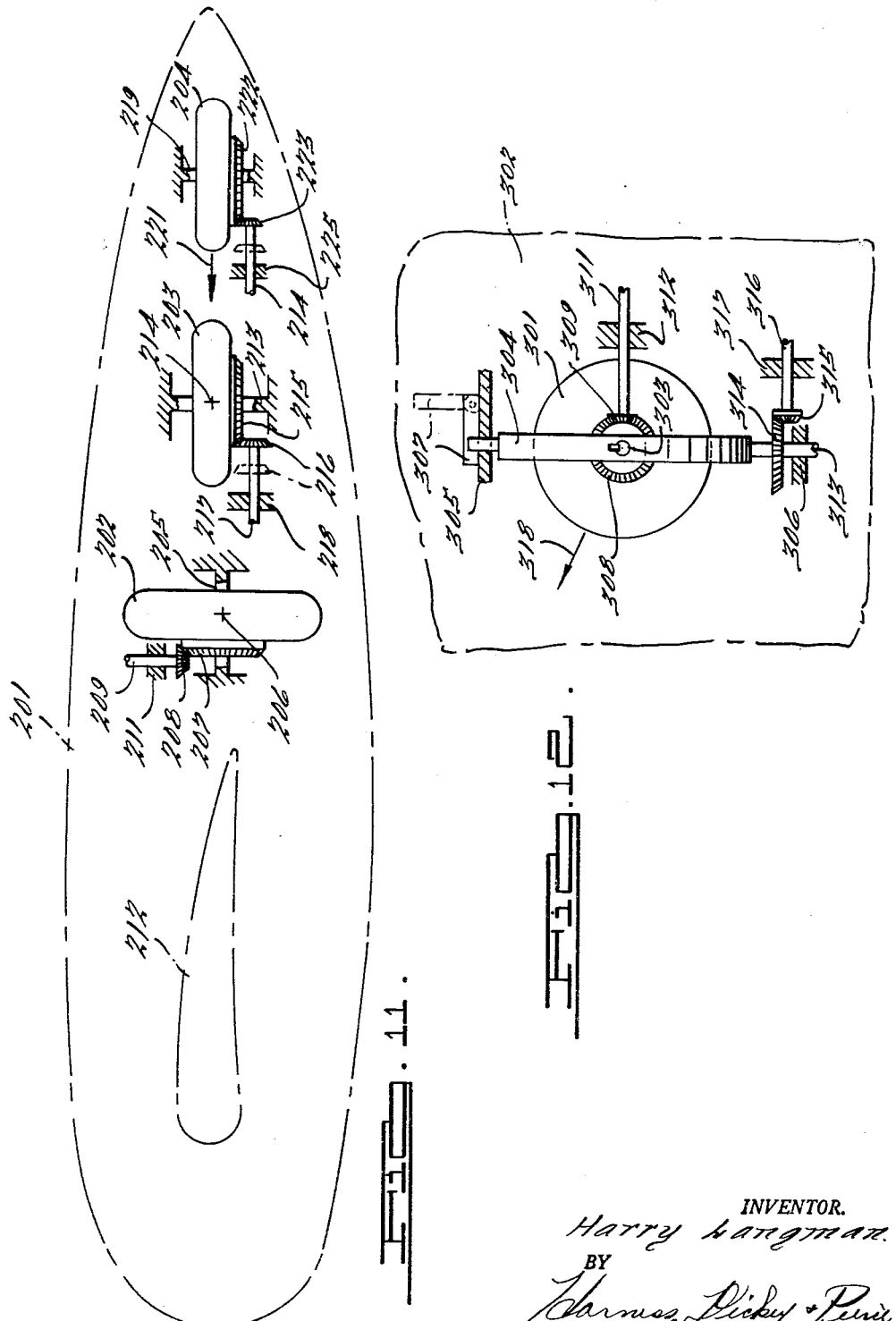

United States Patent Office 3,006,581
Patented Oct. 31, 1961

3,006,581
VEHICLE AND STEERING APPARATUS
THEREFOR
Harry Langman, 913 Congress St., Ypsilanti, Mich.
Filed Dec. 11, 1958, Ser. No. 779,768
22 Claims. (Cl. 244—79)

This invention relates to vehicles and steering apparatus therefor.

It is an object of the invention to provide novel and improved vehicle constructions including means for steering or otherwise maneuvering such vehicles, without the necessity of relying on a reaction between any portion of the vehicle and its supporting medium in order to achieve this maneuverability.

It is another object to provide a novel and improved vehicle maneuvering apparatus of this character which is extremely versatile in nature and is applicable to land, sea, air or space vehicles.

It is also an object to provide an improved vehicle steering apparatus of this nature which depends for its action solely on forces exerted internally of the vehicle, and is capable of achieving extremely rapid changes in vehicle direction, regardless of the rate of movement (or lack of movement) of the vehicle in its supporting medium.

It is a further object to provide a novel and improved gyroscopic assembly which may be incorporated as a unit in the steering apparatus of this invention, which will automatically compensate for changes due to friction or other causes and which will provide a constant gyroscopic force in a fixed direction for carrying out the purposes of the invention.

It is a further object to provide an improved gyroscopic unit of this character which may be installed in a variety of positions, thus making it capable of use in airborne vehicles for steering, banking, or elevational changes.

It is also an object, in one form of the invention, to provide a novel and improved type of automotive vehicle having an extremely high degree of maneuverability.

Other objects, features and advantages of the present invention will become apparent from the following detailed description taken in conjunction with the accompanying drawings, in which:

FIGURE 1 is a vector diagram illustrating some of the principles on which the invention is based;

FIGURE 2 is a schematic plan view of a water-borne vehicle incorporating the principles of the invention;

FIGURE 3 is a partially schematic enlarged cross-sectional view in elevation taken along the line 3—3 of FIGURE 2 and showing the internal construction of the novel gyroscopic unit;

FIGURE 4 is a vector diagram illustrating the principles of operation of the unit shown in FIGURE 3;

FIGURE 5 is an enlarged cross-sectional view of the fixed shaft for supporting the unit showing the commutator segments and brushes;

FIGURE 6 is a fragmentary plan view of the shaft further showing the commutator construction;

FIGURE 7 is a cross-sectional view of a suitable gyroscopic wheel for use in the invention;

FIGURE 8 is a side elevational view of an automotive vehicle incorporating the principles of the invention;

FIGURE 9 is a plan view of the vehicle showing the location of the balancing gyroscopes;

FIGURE 10 is a detailed elevational view of a supporting rack for use when the vehicle is at rest;

FIGURE 11 is a schematic elevational view of an airborne vehicle incorporating the principles of the invention; and FIGURE 12 is a schematic view of an alternate embodiment of the invention for use with air-borne vehicles.

The basic operation of the invention may perhaps best be described by the use of vectors as applied to rotating gyroscopic bodies. Referring to FIGURE 1, it is well known to utilize an arrow or vector such as that indicated at 21 having a specific direction and length to represent the properties of a gyroscopic body such as a symmetrically balanced rotating wheel. By convention, if the wheel rotates on a predetermined axis in the direction indicated by the circular arrow 22, vector 21 is chosen to point in the direction toward which a right-handed screw would advance if turned with the wheel. The length of vector 21, which is parallel to the rotational axis, is made proportional to the angular momentum of the wheel.

If, while the wheel is rotating on its own axis, a rotational couple is applied to the wheel about another axis, this may be represented by a second vector 23. Vector 23 will point in the direction toward which a right-handed screw would advance if rotated in the direction of the second couple, say that represented by the curved arrow 24, and the length of vector 23 will be proportional to the strength of the applied couple.

It is well known that the phenomenon known as "precession" will result from this action. In other words, the axis of the wheel will tend to shift to a new position represented by the vector 25 which is the vectorial sum of vectors 21 and 23. It is this precessional motion, which is proportional to the strength of the applied couple and inversely proportional to the angular momentum of the spinning wheel, which is utilized in the various embodiments of the invention.

FIGURE 2 illustrates a simple application of the invention to a boat indicated schematically at 26. A gyroscopic unit, indicated generally at 27, is mounted in the boat. This unit will be described in detail below, but for the moment it may be assumed that the unit generates a gyroscopic force equivalent to the vector indicated at 28, that is, equivalent to a wheel rotating on a horizontal axis parallel to the length of the boat, the direction of rotation being clockwise when viewed from the stern of the boat. It will further be assumed for the moment that this equivalent rotating wheel is counterbalanced so that the effect of gravity on the wheel will be nullified. Unit 27, which is of generally disklike shape, is rotatably mounted on a shaft 29 which is fixedly secured to the boat hull. Shaft 29 is horizontally disposed and is at right angles to vector 28.

Means are provided for selectively applying a rotating couple to unit 27 about shaft 29, this means comprising a steering wheel 31 fixed to a shaft 32 which is rotatably mounted in a stationary bearing 33. Shaft 32 carries a bevel pinion 34 which meshes with a bevel gear 35 fixed to one side of unit 27 and coaxial with shaft 29. It will be understood that parts 31–35 are merely representative of other possible ways of manually or automatically exerting a couple on unit 27 about the axis of shaft 29.

From our previous discussion, it will be apparent that the exertion of a couple on unit 27 about the axis of shaft 29 represented, for example, by an upwardly pointing vector in FIGURE 2 will result in a force acting on unit 27 and tending to swing unit 27 so that vector 28 will assume a horizontal position between its previous position and that of the axis of shaft 29. This could be represented, for example, by the vector 28′ shown in dot-dash lines in FIGURE 2. However, since shaft 29 is fixed to boat 26, the shaft and boat will turn in the water with unit 27, so that the boat will assume a new direction. This will be true whether the boat is under way or stationary in the water. The opposite steering effect will occur if a torque is exerted on unit 27 in the opposite direction.

It should be noted that the advantages of such a steering arrangement for water-borne craft are considerable. In the case of a ferryboat, for example, the novel steering apparatus would enable the boat to enter a slip at extremely slow speeds without having to rub against side barriers to attain its proper direction. It should also be observed that for purposes of this embodiment of the invention it would not be necessary that the axis of shaft 29 be exactly athwartships, it merely being required that the axis be horizontal and that the gyroscopic force represented by vector 28 also be in a horizontal plane.

Gyroscopic unit 27 preferably comprises a novel construction shown in detail in FIGURES 3–6. It is an object of the construction shown in FIGURES 3–6 to provide a gyroscopic force which will maintain as closely as possible its desired direction and strength, as represented by an arrow 28 which is continually in a horizontal plane and is of constant length. It will be recognized that a simple gyroscopic wheel, even though counterbalanced, will not be capable of maintaining a constant position and gyroscopic force, since frictional and other external forces would eventually throw it out of alignment, thus detracting from the steering efficiency.

As shown partially schematically in FIGURE 3, unit 27 comprises a casing 36 of generally disklike shape rotatably mounted on shaft 29, which as stated previously is fixedly secured to the hull of boat 26. The interior of casing 26 is provided with an annular supporting member 37, and six radially extending posts 38, 39, 41, 42, 43 and 44 are fixedly secured to member 37 and extend therethrough, the inner ends of these posts each carrying a pair of brushes 45 and 46 which engage commutator segments on shaft 29 as described below. The outer end of each post carries a reversible electric motor 47 having a shaft 48 aligned with its corresponding post. A gyroscopic wheel 49 is secured to each shaft 48. Each wheel 49 is preferably fabricated of heavy material so as to provide substantial angular momentum, FIGURE 7 showing a suitable shape of the wheel which has a hub 51 secured to shaft 48 and a relatively thick flange portion 52. Posts 38–44 are equidistantly spaced around supporting member 37, thus providing 60 degree angles between the posts. It will be understood, however, that a different number of posts and their connected parts could be used within the principles of the invention.

As is best seen in FIGURE 5, fixed shaft 29 is provided with a pair of commutator segments 53 and 54 in side-by-side relation and insulated from each other on the side of the shaft facing the forward end of the boat, and another pair of commutator segments 55 and 56 similarly arranged on the opposite side of the shaft. An insulative segment 57 in the upper portion of the shaft separates segments 53 and 55 as well as segments 54 and 56. Another insulative segment 58 separates the same commutator segments on the underside of the shaft. The segments are so positioned that brush 45 of each post will be aligned with segments 53 and 55 while brush 46 will be aligned with segments 54 and 56.

One wire 59 of a pair of wires comprising a power source is connected to segments 54 and 55, while the other wire 61 of the power source is connected to segments 53 and 56. With this arrangement, it will be seen that when any post is positioned so that its brushes engage segments 53 and 54, its motor 47 will be driven in one direction, whereas when its brushes engage segments 55 and 56 the motor will be driven in the opposite direction. When a pair of brushes engages the insulative segments 57 or 58 on the upper and lower portions of shaft 29, their corresponding motor 47 will be deenergized.

The operational result of this arrangement will become apparent by referring to the arrows which represent the directions of rotation of wheels 49 for the position shown in FIGURE 3, and by further reference to the vector diagram of FIGURE 4. Assuming that posts 38 and 42 are horizontally aligned, the brushes of post 38 will engage segments 53 and 54 with the resulting rotation of wheel 49 being in the direction of the arrow 62. The brushes of post 42 will engage segments 55 and 56 resulting in wheel 49 rotating in the direction of the arrow 63. Both wheels will therefore exert a gyroscopic force which could be represented by the vector 28a in FIGURE 4; that is, the wheels of both posts 38 and 42 will be in aiding relation. The wheels of posts 39 and 43 will rotate in the same directions as the wheels of posts 38 and 42, respectively, and will be in aiding relation as represented by vector 28b. The horizontal component 28b' of this vector will be in the same direction as vector 28a. Similarly, the wheels supported by posts 41 and 44 will aid each other as represented by vector 28c, the horizontal component 28c' of this vector being in the same direction as vector 28a. The vertical components of vectors 28b and 28c will nullify each other when the unit is in the position of FIGURE 3. The resultant gyroscopic force of all six wheels could therefore be represented by vector 28 of the proper length.

Should casing 36 and its internally mounted parts be rotated away from the position shown in FIGURE 3, due to frictional forces, the rotation by steering wheel 31, or other causes, the resultant gyroscopic force will still always be approximately in the direction of vector 28. This is because brushes 45 and 46 on each post will shift to different commutator segments as casing 36 is rotated, reversing the directions of motors 47 as the wheels assume new positions. For example, should the casing be rotated 120° clockwise from the position of FIGURE 3, the wheels on posts 38, 39, 42 and 43 will have reversed their rotation, while those on posts 41 and 44 will rotate in the same direction. The transition from one type of rotation to the other will of course be facilitated by insulative segments 57 and 58.

It should be noted that due to the symmetrical construction of unit 27 the force of gravity will have no effect on the parts since they will be completely balanced at all times. As noted previously, it is not necessary that shaft 29 be athwartships, nor is the location of unit 27 within the ship critical. The effect of the rotation of all the wheels in the housing will be equivalent of the rotation of a larger single wheel supported by post 38 when in the position of FIGURE 3. Should unit 27 be rotated to a position in which the wheels are not symmetrical about a horizontal plane, small vertical components of the gyroscopic forces will become unbalanced, which might create a tendency for the boat to pitch. To overcome this possibility, the size of insulative segments 57 and 58 could be increased (with a corresponding decrease in the sizes of segments 53–56). Alternatively, the number of rotating wheels 49 could be increased, or the current supplying motors 47 could be automatically decreased as the axis of each motor formed a larger angle with the horizontal. Combinations of these compensating arrangements could also of course be utilized.

FIGURES 8–10 show a modified form of the invention as applied to a land or automotive vehicle, generally indicated at 101. The vehicle has a body 102 of elongated shape, and a single supporting wheel 103 is rotatably mounted on a transverse axle 104 centrally of the vehicle. The portions of the body to the front and rear of wheel 103 are inclined upwardly as seen in FIGURE 8. Wheel 103 is driven by an engine 105 through a chain drive 106. A passenger compartment 107 is suitably provided in a central portion of the vehicle, this compartment having seats 108 and a windshield 109.

The vehicle is balanced on its single wheel 103 by a plurality of gyroscopic wheels mounted on vertical axes. Two such wheels 111 and 112 are shown in the present embodiment, as seen in FIGURE 9. Wheel 111 is mounted adjacent the forward portion of the vehicle and on the right-hand side, while wheel 112 is mounted behind the passenger compartment on the left-hand side, the weights of the two wheels thus being balanced with respect to wheel 103. Both wheels 111 and 112 rotate in the same direction, as indicated by their respective arrows. It will be understood that if the wheels rotated in opposite directions they would not be effective to balance the vehicle. Wheels 111 and 112 may be driven by a separate engine 113, or may alternatively be driven by engine 105. As will be noted below, the rotation of these balancing wheels will have no effect whatever on the steering mechanism, since steering or turning will not alter the direction of the vertical axes of rotation. It should also be observed that a different number of wheels, or only one wheel could be used to achieve this balancing effect, and that the wheels themselves need not necessarily be symmetrically arranged with respect to supporting wheel 103, as long as the weight distribution of the entire vehicle is approximately in balance.

To steer the vehicle, a gyroscopic unit 114 is provided, this unit being similar in construction to unit 27 of the previous embodiment. Gyroscopic unit 114 is rotatably mounted on a shaft 115 which is fixed to the vehicle chassis at the forward end thereof, as seen in FIGURE 9. A steering wheel 116 is provided, this wheel having a steering shaft 117 connected by bevel gearing to unit 114. The operation of unit 114 will be similar to that described above with respect to unit 27. When a couple is exerted on unit 114 about the axis of shaft 115, a precessional motion of unit 114 will take place, thus shifting the axis of shaft 115 in a horizontal plane. Since the vehicle is mounted on only a single wheel 103, it will turn along with shaft 115 to its new direction.

In order to counter act the tendency of any unbalance in weight of the vehicle to cause unwanted listing or careening of the car, a longitudinal track 118 carrying a slidable weight 119 is provided, as well as a transverse track 121 carrying a slidable weight 122. To illustrate the use of these weights, assume that the weight distribution of vehicle 101 is such that the vehicle tends to careen to the left. By shifting weight 119 to the rear on track 118, this couple could be counteracted.

Due to frictional and other causes, it might be possible under some circumstances that vehicle 101 would assume an undesired attitude after running for some time in which the front and rear of the vehicle were at unequal heights. Under these circumstances, vector 28 will of course also be tilted with respect to the horizontal, since shaft 115 will be displaced from its normal position. To correct this, a pair of rollers 123 and 124 are provided on opposite sides of front bumper 125. Should it be desired to correct the attitude of the vehicle, one roller or the other could be brought up against a post, pillar or other object, and a force exerted by steering wheel 116 on unit 114 tending to steer the vehicle against the post. This would cause the vehicle to right itself, since the precessional force on unit 114 will have a vertical component. Alternatively, auxiliary corrective gyroscopic units, such as those described below with respect to FIGURE 11, could be used. Also provided for convenience in parking or emergencies are a set of four wheels 126 mounted on vertically movable racks 127 held by ratchets 128, as seen in FIGURE 10. These could be released by control wires 129 which would withdraw the ratchets against the action of leaf springs 131 to permit racks 127 to drop so that rollers 126 would engage the ground, after which ratchets 128 could be released to hold the racks in position.

When applying a brake to wheel 103 to stop the vehicle, the momentum of the car would tend to create a couple on unit 114 tending to veer or careen the car to the left. This could be counteracted by shifting weight 119 to the rear by manual or automatic means as the car is braked.

FIGURE 11 illustrates another modification of the invention as applied to air-borne vehicles such as airplanes or space ships. An airplane is shown schematically at 201. Three gyroscopic units 202, 203 and 204 are mounted within the airplane, these units being constructed in the same manner as units 27 and 114 of the previous embodiments. Unit 202 is used for steering in a horizontal plane, unit 203 for banking the airplane, and unit 204 for elevating or lowering the craft. Unit 202 is rotatably mounted on a shaft 205 which is fixedly secured to the hull of the aircraft. The axis of shaft 205 is parallel to the longitudinal axis of the airplane, so that the effective gyroscopic force exerted by unit 202 is in the direction of a vector 206 which points into the paper. It will be noted that this is unlike the steering units of the previous embodiments, in which the rotational axis extended athwartships. However, bearing in mind that as long as both the axis of shaft 205 and vector 206 are in a horizontal plane, steering may be accomplished, the fact that vector 206 extends athwartships is immaterial for steering purposes. The reason why vector 206 is so positioned is that it will not be affected by tilting the aircraft for ascending or descending, as will be later described. If shaft 205 were to extend athwartships as in the previous embodiments, tilting of the craft for climbing or diving would cause unwanted steering of the ship in a horizontal plane.

A bevel gear 207 is secured to unit 202 and is operable by a pinion 208 secured to a steering shaft 209 which is rotatably mounted in a stationary bearing 211. By rotating shaft 209, a precessional force will be exerted by unit 202 on shaft 205, causing the shaft and its attached aircraft to assume a new position in a horizontal plane. As in the previous embodiment, elements 207—211 are merely representative of various manual or power steering arrangements which could be used.

Unit 203 is provided in order to assure the required amount of banking of the airplane when unit 202 is operated. It will be appreciated, of course, that merely changing the direction in which the aircraft points, without banking the craft, would result merely in side slip of the airplane since wings 212 would not meet sufficient air resistance. Unit 203 is rotatably mounted on a shaft 213 which is fixed on a vertical axis to the aircraft. Unit 203 exerts a gyroscopic force in the direction of a vector 214 which, like vector 206, points into the paper and is in a horizontal plane. A bevel gear 215 secured to unit 203 is rotatable by a pinion 216 mounted on a shaft 217 which is rotatably mounted in a stationary bearing 218. Rotation of shaft 217 will thus cause a precessional movement of unit 203 about the longitudinal axis of the aircraft, so that banking will take place. The movements of shafts 209 and 217 may of course be coordinated by any desired mechanism.

In order to steer the aircraft while rolling along the ground without any corresponding banking movement, shaft 217 may be slidably mounted in bearing 218 so that pinion 216 may be retracted from engagement with gear 215. With pinion 216 in its dot-dash position as shown in FIGURE 11, steering of the craft in a horizontal plane will have no effect on unit 203, which will rotate freely on shaft 213. It should be kept in mind, however, that, because of the commutator construction on shaft 213, vector 214 of unit 203 will always point athwartships. It should also be noted that while unit 203 is of the same general construction as unit 202, it need not necessarily be of the same size or power.

Unit 204 is mounted on a vertically disposed shaft 219 which is fixedly secured to the aircraft, and has a gyroscopic force represented by a vector 221 which points directly forwardly in a horizontal plane. A bevel gear 222 secured to unit 204 is engageable by a pinion 223 mounted on a shaft 224 which is rotatably supported by a stationary bearing 225. It will be observed that rotation of unit 204 by shaft 224 will cause a precessional force to be exerted on shaft 219 such that this shaft will be tilted in a vertical plane to point the aircraft upwardly or downwardly. As noted previously, tilting of the aircraft in a vertical plane will not affect its steering because of the position of unit 202. However, when the aircraft is being steered by operation of units 202 and 203, unit 204 should be disconnected, and this may be done by axial movement of shaft 224 withdrawing pinion 223 to its dot-dash position.

It will thus be seen that, in the embodiment of FIGURE 11, gyroscopic units are utilized to maneuver an aircraft about three mutually perpendicular axes. Since this maneuvering may be done quickly and within a small radius, significant advantages accrue, such as in avoiding an imminent collision, facilitating landing in stormy weather, and providing more nearly instant mobility in a so-called dogfight in war. As mentioned previously, the arrangement of FIGURE 11 could be used in an automotive vehicle of the type illustrated in FIGURES 8 to 10, serving not only as steering, tilting and banking controls but also as auxiliary corrective gyroscopic units to prevent unwanted listing or changes in attitude of the vehicle.

FIGURE 12 illustrates an alternative embodiment for use in aircraft, in which a single gyroscopic unit may be utilized for steering and banking, as well as for elevational purposes. A gyroscopic unit 301 is provided in aircraft 302, this unit being rotatably mounted on a shaft 303 which is horizontally disposed and fixed within a gimbal 304. The gimbal is mounted for rotation on a vertical axis by means of bearings 305 and 306 secured to the aircraft, and is normally so positioned that the axis of shaft 303 runs athwartships. A retractable locking member 307 is provided for selectively locking gimbal 304 to the aircraft in its normal position, member 307 when in its retracted or dot-dash line position permitting rotation of the gimbal about a vertical axis. A bevel gear 308 is secured to one side of unit 301 and is rotatable by a pinion 309 mounted on a shaft 311 which is rotatably mounted in a stationary bearing 312. The lower mounting pin 313 of gimbal 304 has a bevel gear 314 which meshes with a pinion 315 on a shaft 316. This shaft is rotatably mounted in a bearing 317 secured to the craft. Unit 301 is so constructed that its resultant gyroscopic force points forwardly and upwardly as represented by the vector 318.

In operation of the embodiment of FIGURE 12, if it is desired to steer and bank the craft, gimbal 304 will be locked in place by placing member 307 in its solid-line position. If a rotary force is applied to unit 301 by shaft 311, a precessional movement of shaft 303 will take place in the plane defined by vector 318 and the axis of shaft 303. Since shaft 303 is fixedly secured to the aircraft through locked gimbal 304, the craft will steer and bank. If it is desired to cause ascent or descent of the aircraft, member 307 will be moved to its dot-dash line position, and a rotational force will be applied to the unlocked gimbal by shaft 316. This will cause precessional movement of unit 301 in the plane defined by vector 318 and the axis of gimbal 304. Since unit 301 is prevented from rotation relative to aircraft 302 about the axis of shaft 303 by means of pinion 309, shaft 311 (which is normally held stationary), and bearing 312, the craft will tilt along with unit 301. It should be observed that the above described embodiments as applied to aircraft are merely illustrative of those which could be provided using the principles of the invention.

Steering units of the type described may also be used in conjunction with dirigibles or blimps, whether or not they are in motion horizontally. A further application of the novel steering unit would be to rocket-propelled aircraft or space ships, in which case the units would eliminate the need for rocket repulsion forces used for steering. The advantages of such an arrangement are obvious, especially during the landing portion of a space ship flight. It should be noted that only two gyroscopic units would be needed to orient a space ship to any position desired.

While it will be apparent that the embodiments of the invention herein disclosed are well calculated to fulfill the objects of the invention, it will be appreciated that the invention is susceptible to modification, variations and change without departing from the proper scope or fair meaning of the subjoined claims.

What is claimed is:

1. In combination, a gyroscopic unit comprising a supporting frame rotatably mounted on an axis, a plurality of gyroscopic wheels on angularly displaced axes mounted in spaced relation on said frame, and means causing rotation of said wheels such that in any rotational position of said frame the gyroscopic effect of the rotation of said plurality of wheels is substantially the equivalent of the rotation of a single wheel on a predetermined axis fixed with respect to said rotational axis, whereby a couple exerted on said frame about said rotational axis will produce substantially the same precessional force of said gyroscopic unit regardless of the rotational position of the unit.

2. In combination, a vehicle, a shaft fixed to said vehicle on a horizontal axis, a gyroscopic unit rotatably mounted on said shaft, said unit comprising a plurality of rotatable gyroscopic wheels on angularly displaced axes, means causing rotation of said wheels as to exert a gyroscopic force substantially equivalent to that of a single wheel on a horizontal axis perpendicular to said first axis, and means for exerting a couple on said gyroscopic unit about said first axis, whereby said unit will exert a precessional force tending to turn said shaft and the vehicle to which it is secured about a vertical axis.

3. In a gyroscopic unit for use in a steering apparatus, a shaft, a supporting frame rotatably mounted on said shaft, a plurality of gyroscopic wheels supported by said frame on equidistantly spaced radial axes, means for rotating said wheels in either of opposite directions on their respective axes, and means for selectively energizing said rotating means in response to changes in the angular position of said frame on said shaft, whereby the resultant gyroscopic force exerted by said wheels will be substantially along a line fixed with respect to said shaft axis regardless of the angular position of said frame on said axis.

4. In a gyroscopic unit adapted for use in a steering mechanism, a shaft, a supporting frame rotatably mounted on said shaft, a plurality of reversible electric motors with radially extending shafts supported by and equidistantly spaced around said frame, gyroscopic wheels secured to said motor shafts, a pair of commutator segments on one side of said shaft in side-by-side relation, a second pair of commutator segments on the other side of said shaft in side-by-side relation, a pair of brushes connected to each of said motors and engageable with either said first or said second pair of segments depending upon the angular position of said supporting frame, and electrical connections to said segments for causing the motors engaging one pair of segments to rotate in one direction and the motors engaging the other pair of segments to rotate in the opposite direction, whereby a resultant gyroscopic force will be exerted by said wheels substantially along a line fixed with respect to said axis regardless of the angular position of said frame on the axis.

5. The combination according to claim 4, further provided with insulative segments on the upper and lower portions of said shaft separating said first and second pairs of commutator segments, said insulative segments being of substantial arcuate length whereby each of said motors will be deenergized when its axis is in the vicinity of a vertical plane.

6. In combination, a vehicle, a shaft fixed to said vehicle and having a horizontal axis, a housing of disk-like shape rotatably mounted on said shaft, means for exerting a couple on said housing about said shaft axis, a supporting frame within said housing, a plurality of equidistantly spaced radially extending posts secured to said frame, electric motors carried by said posts, gyroscopic wheels secured to said motor shafts on axes aligned with said posts, and commutator means on said shaft and posts for causing wheels on one side of a vertical plane including said axis to rotate in one direction and wheels on the other side of said plane to rotate in the opposite direction when viewed from the shaft axis, whereby the resultant gyroscopic force of said wheels will be substantially along a horizontal line perpendicular to said shaft axis.

7. In an automotive vehicle, a body, a single road-engaging wheel rotatably supported at a central portion of the underside of said body, means for steering said vehicle comprising a gyroscopic unit rotatably mounted on a horizontal axis fixed with respect to said body, means for exerting a couple on said unit about said axis, and means within said unit responsive to the exertion of said couple for exerting a precessional force on said axis about a vertical axis, said means including at least two gyroscopic wheels on angularly displaced axes for creating the effect of a single gyroscope located on an axis substantially fixed with respect to the vehicle and at right angles to said horizontal axis, regardless of the angular position of said unit on said horizontal axis.

8. The combination according to claim 7, further provided with means for balancing said body comprising at least two gyroscopic wheels mounted on vertical axes located on opposite sides of said central wheel and rotatable in the same direction.

9. The combination according to claim 7, further provided with a pair of rollers mounted at one end of said vehicle on opposite sides thereof, said rollers being engageable with a stationary object, whereby tilt of said vehicle may be corrected.

10. The combination according to claim 7, further provided with means for balancing said body comprising at least two gyroscopic wheels mounted on vertical axes located on opposite sides of said central wheel and rotatable in the same direction, engine means in said vehicle for driving said road-engaging wheel, and means for supporting said vehicle in a level position when at rest, said last-mentioned means comprising a vertically movable rack at each end of the vehicle, and road-engaging means at the lower end of each rack.

11. In a maneuvering arrangement for an air-borne vehicle, means for steering said vehicle about a steering axis transverse to the vehicle comprising a gyroscopic unit rotatably mounted on an axis extending parallel to the longitudinal axis of said vehicle, means for exerting a couple on said gyroscopic unit about said last-mentioned axis, means within said gyroscopic unit responsive to said couple for exerting a precessional force on said vehicle tending to steer the vehicle about said steering axis, said last-mentioned means including at least two gyroscopic wheels on angularly displaced axes for creating the effect of a single gyroscope rotating on an axis substantially fixed with respect to the vehicle and at right angles to the axis on which said gyroscopic unit is rotatably mounted, regardless of the angular position of said unit on said last-mentioned axis, a second gyroscopic unit for tilting said vehicle about a tilting axis transverse to the vehicle and perpendicular to said first axis, said second gyroscopic unit being rotatably mounted on an axis parallel to said steering axis, means for exerting a couple on said second gyroscopic unit about its rotational axis, and means within said second gyroscopic unit responsive to such couple for exerting a tilting force on said vehicle about said tilting axis.

12. The combination according to claim 11, further provided with means for banking said air-borne vehicle about its longitudinal axis, said last-mentioned means comprising a third gyroscopic unit fixed to said vehicle on an axis parallel to said steering axis, and means in said third gyroscopic unit responsive to movement of said vehicle about said steering axis for exerting a couple on said vehicle tending to bank the vehicle about its longitudinal axis.

13. Means for maneuvering an aircraft with respect to a horizontal position comprising a first gyroscopic unit rotatably mounted on an axis fixed with respect to the craft and extending longitudinally thereof, means for exerting a couple on said first gyroscopic unit about said longitudinal axis, means within said first gyroscopic unit for exerting a gyroscopic force representable by a vector in a horizontal plane perpendicular to said longitudinal axis, whereby application of said couple will cause said first gyroscopic unit to exert a precessional force tending to rotate the craft about a vertical axis, said last-mentioned means including at least two gyroscopic wheels on angularly displaced axes for creating the effect of a single gyroscope exerting a gyroscopic force representable by said vector regardless of the angular position of said unit on said longitudinal axis, a second gyroscopic unit rotatably mounted on a vertical axis fixed with respect to the craft, means for exerting a couple on said second gyroscopic unit about its rotational axis, said last-mentioned couple-exerting means being disconnectable from said second gyroscopic unit whereby such unit may rotate freely on its axis, and means within said second gyroscopic unit exerting a gyroscopic force representable by a vector parallel to said first vector, whereby steering movement of said craft about a vertical axis will cause said second gyroscopic unit to exert a precessional force tending to bank said craft.

14. A combination according to claim 13, further provided with a third gyroscopic unit rotatably mounted on a fixed vertical axis within said craft, means for exerting a couple on said third gyroscopic unit about its rotational axis, said last-mentioned couple-exerting means being disconnectable from said third gyroscopic unit to permit such unit to rotate freely on its axis, and means within said third gyroscopic unit exerting a gyroscopic force representable by a horizontal vector extending longitudinally of the craft, whereby exertion of a couple on said third gyroscopic unit will cause said unit to exert a precessional force on said craft tending to tilt the craft in a vertical plane.

15. In a device for steering, banking and elevating an aircraft, a gimbal mounted on a vertical axis within said craft, means for selectively locking said gimbal to said craft for preventing rotation of the gimbal on an axis in the gimbal plane, means for exerting a couple on said gimbal tending to rotate the gimbal on said last-mentioned axis, a gyroscopic unit rotatably mounted on a horizontal axis carried by said gimbal, means for holding said gyroscopic unit against rotation on said gimbal-supported axis, means within said gyroscopic unit exerting a gyroscopic force representable by a vector in a longitudinal vertical plane and inclined from a horizontal plane, and means for exerting a couple on said gyroscopic unit about its axis, whereby exertion of said last-mentioned couple when said gimbal is locked to said craft will cause said gyroscopic unit to exert a precessional force tending to steer and bank the craft, exertion of said gimbal couple on the gimbal when said gimbal is unlocked from said craft causing said gyroscopic unit to exert a precessional force tending to tilt said craft about a horizontal transverse axis.

16. In combination, a vehicle, a unit rotatably mounted on an axis fixed relative to said vehicle, and means including at least two gyroscopic wheels on angularly displaced axes carried by said unit for creating the effect of a single gyroscope rotating on an axis substantially fixed with respect to said vehicle and at right angles to the first axis, regardless of the angular position of said unit on said first axis.

17. In combination, a vehicle, a unit rotatable on an axis fixed with respect to said vehicle, means for creating the effect of a single gyroscope rotating on an axis at right angles to the first axis, and means including at least two gyroscopic wheels on angularly displaced axes responsive to rotation of said unit on said axis for maintaining said gyroscope axis substantially fixed with respect to said vehicle.

18. In combination, a vehicle, a unit rotatably mounted on an axis fixed relative to said vehicle, and means including at least two gyroscopic wheels on angularly displaced axes carried by said unit for creating the effect of a single gyroscope rotating on an axis substantially at right angles to the first axis and fixed with respect to the vehicle regardless of the angular position of said unit on its axis, said means being responsive to a couple exerted on the unit about said first axis for causing a force to be exerted on said first axis tending to change the orientation of said vehicle.

19. In a maneuvering and stabilizing arrangement for a vehicle having a longitudinal and a transverse axis, means for steering said vehicle about a vertical steering axis comprising a gyroscopic unit rotatably mounted on a horizontal axis, means for exerting a couple on said gyroscopic unit about said last-mentioned axis, means within said gyroscopic unit responsive to said couple for exerting a precessional force on said vehicle tending to steer said vehicle about said steering axis, said last-mentioned means including at least two gyroscopic wheels on angularly displaced axes for creating the effect of a single gyroscope rotating on an axis substantially fixed with respect to the vehicle and at right angles to the axis on which said gyroscopic unit is rotatably mounted, regardless of the angular position of said unit on said last-mentioned axis, a second gyroscopic unit rotatably mounted on said vehicle on a vertical axis, means within said second gyroscopic unit responsive to a couple exerted about the longitudinal vehicle axis for exerting a precessional force tending to counteract said last-mentioned couple, a third gyroscopic unit rotatably mounted on a vertical axis, and means within said third gyroscopic unit responsive to a couple exerted about said transverse vehicle axis for exerting a precessional force tending to counteract said last-mentioned couple.

20. The combination according to claim 19, further provided with selectively engageable means for exerting a couple on each of said second and third gyroscopic units about their respective axes.

21. The combination according to claim 7, further provided with means for balancing said body comprising at least one gyroscopic wheel mounted on a vertical axis.

22. The combination according to claim 7, further provided with means for balancing said body comprising at least two gyroscopic wheels mounted on vertical axes and rotatable in the same direction.

References Cited in the file of this patent

UNITED STATES PATENTS

| | | |
|---|---|---|
| 1,947,562 | Marmonier | Feb. 20, 1934 |
| 2,158,180 | Goddard | May 16, 1939 |
| 2,734,383 | Paine | Feb. 14, 1956 |
| 2,856,142 | Haviland | Oct. 14, 1958 |